July 15, 1941.    C. W. CRUMRINE    2,249,517
SHUTTER
Filed March 22, 1939
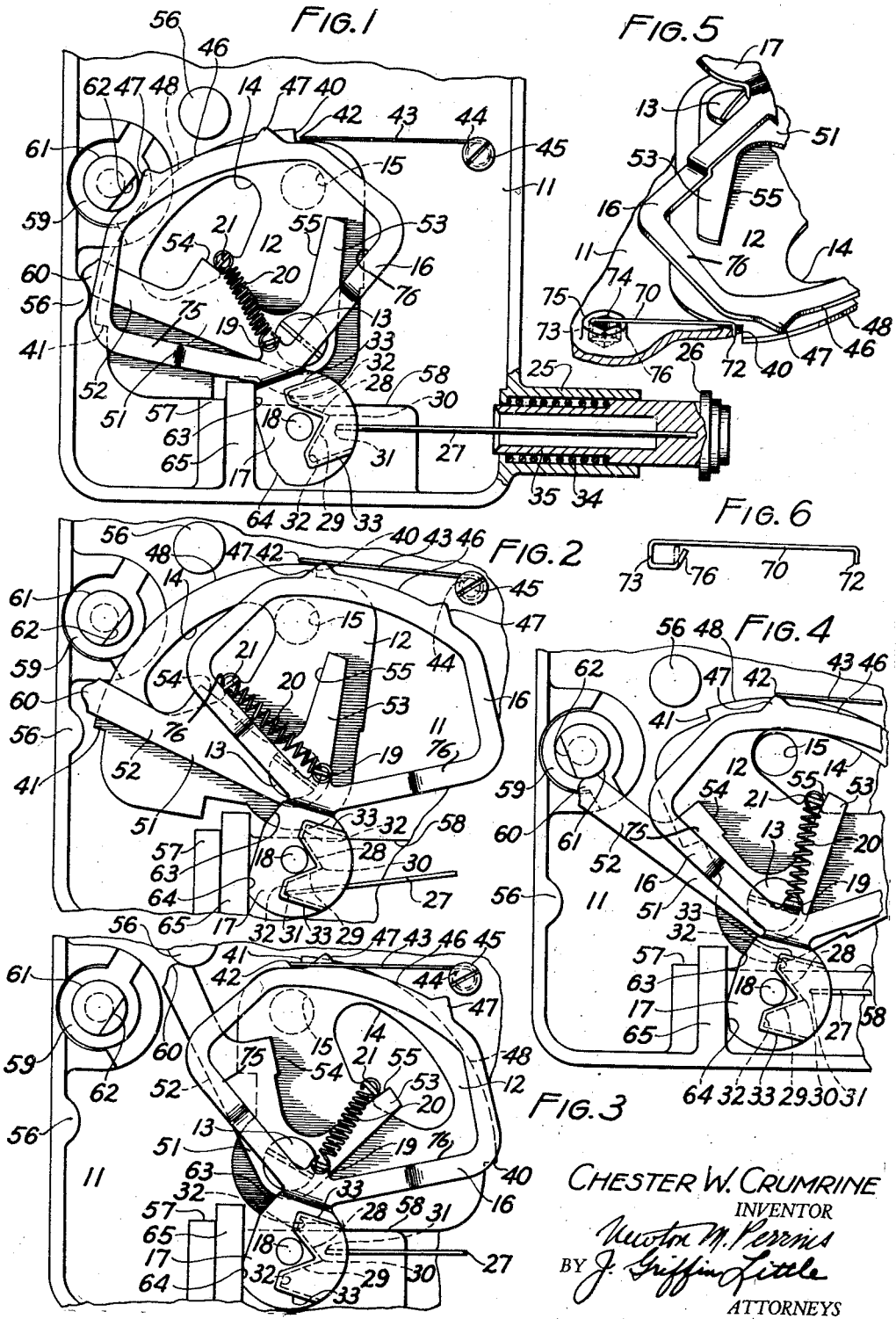
CHESTER W. CRUMRINE
INVENTOR
BY
ATTORNEYS Patented July 15, 1941

2,249,517

UNITED STATES PATENT OFFICE 2,249,517

SHUTTER

Chester W. Crumrine, Rochester, N. Y., assignor to Eastman Kodak Company, Rochester, N. Y., a corporation of New Jersey Application March 22, 1939, Serial No. 263,449

12 Claims. (Cl. 95—59)

The present invention relates to improvements in photographic shutters of the single action type which are adapted to be oscillated in opposite directions to make successive exposures.

One object of the invention is the provision of an arrangement for positively holding a shutter of this type until the shutter has been properly tensioned, and then automatically releasing the shutter so that it may quickly move to make the exposure, and, after the exposure has been made, again positively holding the shutter against rebound.

Still another object of the invention is the provision in a shutter of this type of a single movable member which serves not only to tension the shutter but also to release the shutter holding member when the shutter has been properly tensioned.

Yet another object of the invention is the provision of a novel form of time stop lever which positions the shutter for making time exposures.

To these and other ends, the invention resides in certain improvements and combinations of parts, all as will be hereinafter more fully described, the novel features being pointed out in the claims at the end of the specification.

In the drawing:

Fig. 1 is a plan view of a shutter constructed in accordance with the present invention;

Fig. 2 is a view similar to Fig. 1, but with the parts in the position where the shutter has been tensioned and just after it has been released to make the exposure;

Fig. 3 is a view of the shutter parts after the completion of the exposure by moving the shutter to the right and showing the arrangement by which the shutter blade is positively held against rebound;

Fig. 4 is a view of the shutter parts positioned to take a time exposure; and

Fig. 5 is a perspective view of a portion of the shutter illustrated in Figs. 1 to 4, showing the arrangement for engaging the shutter to hold the latter until it is properly tensioned, and also a modified form of shutter holding spring and a novel arrangement for anchoring one end of this spring to the shutter plate.

Fig. 6 is a view of shutter holding spring shown in Fig. 5.

Similar reference numerals throughout the various views indicate the same parts.

In a photographic camera, the shutter is used to control the admission of light through the lens to the sensitized image receiving material. In the less expensive types of cameras, this shutter is usually in the form of a thin flat disk or shutter blade having an arcuate slot which may be quickly moved across or brought into registry with the camera lens to make the exposure. In order to make exposures with such shutters, the shutter spring must first be tensioned so that when the shutter is released, the slot therein will be moved across or brought into registry with the camera lens. After the exposure has been made and the shutter is moved to lens covering position, it is necessary to hold the shutter against rebound so as to prevent a double exposure, as is well known.

To secure these results, the present invention provides a shutter operating blade which is pivotally mounted on the shutter plate and overlies the shutter. A shutter spring connects the shutter to the operating blade so that movement of the latter about its pivot serves to properly tension the shutter spring. To secure this tensioning operation, the shutter is positively held stationary and in lens covering position. When, however, the spring has been sufficiently tensioned, the operating blade engages and moves a shutter holding member out of engagement with the shutter. As the shutter is now free, it may move, under the action of the tensioned shutter spring, to make the exposure. At the completion of the exposure, however, the shutter holding member again moves into the path of the shutter to prevent rebound thereof. The shutter pivot has loosely mounted thereon, a time stop lever which is arranged in a position to stop or arrest the movement of the shutter so that the shutter aperture is held in registry with the camera lens to make a "time" exposure.

In the preferred embodiment of the invention, 11 designates the front board or shutter plate of a camera on which an arcuate shaped shutter 12 of the single action type is pivotally or oscillatably mounted on a stud 13. The shutter is provided with an elongated slot or exposure control opening 14 which is arranged to pass over or to be brought into registry with the lens opening 15 in the plate 11, as is well known. The shutter travels through its maximum movement when an instantaneous exposure is made, but is initially moved through only a portion of its travel to make a time exposure. At the completion of such a time exposure, the shutter is then returned to its initial position so as to again cover the lens opening 15.

The shutter 12 is moved by means of a thin annular shutter operating blade, generally indicated by the numeral 16, which overlies the shutter 12 and is of the shape best shown in the drawing. This blade 16 has formed integral therewith a depending member 17 pivotally or rockably mounted on a stud 18 on the plate 11. The blade 16 is also formed with an upturned lug 19 to which one end of a coil shutter spring 20 is secured. The opposite end of the spring is fastened to a lug 21 formed up from the material of the shutter 12 along the near edge of the slot 14, as clearly shown in Figs. 1 to 4.

It is now apparent from inspection of the drawing, that if the shutter 12 is held stationary, as later described, and the blade 16 is moved about its pivot 18, the shutter spring 20 will be tensioned.

In order to thus pivot the blade 16, the plate 11 is provided with a tubular portion 25, in which is slidably positioned a shutter trigger 26. This trigger carries a thin leaf spring 27 adapted to alternatively engage a pair of right angularly arranged surfaces 28 and 29 formed on a plate, not shown, secured to the back of the member 17. The vertex 30 of the surfaces 28 and 29 is sharp and is slightly offset or eccentric from the plane of the leaf spring 27 so that when the trigger 26 is actuated, the end 31 of the leaf spring 27 will alternately engage the surfaces 28 and 29, and is apparent from inspection of Figs. 1 to 4. As the end 31 of the leaf spring 27 slides along the surfaces 28 or 29, it finally comes to rest against a shoulder 32 formed between the end of the surface 28 or 29 and the side member 33. Now a further movement of the trigger 26 will exert pressure against one of the shoulders 32 to rock the blade 16 about its pivot 18 to tension the shutter spring 20. Upon release of the trigger 26, the latter moves outwardly by means of a coil spring 34 positioned in the tubular portion 25 and surrounding a reduced part 35 of the trigger, as clearly shown in Fig. 1.

During the movement of the blade 16 to tension the shutter spring, it is essential that the shutter 11 be held stationary until the spring has been sufficiently tensioned. To secure this result, the periphery of the shutter is formed with a pair of spaced shoulders or abutments 40 and 41 with which the bent free end 42 of a leaf spring 43 is adapted to engage to hold the shutter against movement until the spring 20 is sufficiently tensioned. The other end 44 of the spring 43 is anchored to a stud 45 on the plate 11. When the parts are in the position shown in Fig. 1, the end 42 abuts the shoulder 40 to hold the shutter stationary until the blade 16 is moved to the right. Then, when the shutter spring 20 is sufficiently tensioned, the end 43 is moved out of engagement with the shoulder 40, as will be presently described, to permit the shutter blade 11 to move to the right to make an instantaneous exposure. After the exposure has been completed, the end 42 now drops behind the other shoulder 41 to prevent shutter rebound, as shown in Fig. 3. When however, the parts are moved to the left, the end 42 first engages the shoulder 41, as shown in Fig. 3, to hold the shutter stationary during the tensioning operation, and, after the exposure is made, drops behind the shoulder 40 to prevent shutter rebound, as shown in Fig. 1. The spring 43 thus serves both to hold the shutter until the spring 20 is fully tensioned, and also engages the shutter at the completion of the exposure to prevent shutter rebound.

It is thus apparent from the above description, that the spring 43 will effectively hold the shutter 11 against movement while the shutter spring is being tensioned by rocking or moving the operating blade 16. It is also apparent that after the shutter spring is fully tensioned, the holding spring 43 must be moved out of engagement with the shutter so that the latter may be free to move under the action of the tensioned spring 20 to make an instantaneous exposure.

To this end, the periphery 46 of the operating blade 16 is formed with a pair of nibs or cams 47 which are arranged to engage and lift the end 42 to disengage the holding spring 43 from the shutter. These nibs are so positioned that the spring 43 is finally disengaged at the time when the spring 20 has been properly tensioned. As the shutter 11 operates in both directions, obviously two sets of nibs 47 are provided. For example, when the parts are in a position shown in Fig. 1, the blade 16 is rocked to the right, as above described, thus bringing the right hand nib 47 into engagement with the end 42 to lift the latter out of engagement with the shutter 11. However, at this time, the spring 20 is not sufficiently tensioned and the shutter does not move. As the right hand nib passes on, the end 42 again drops behind the shoulder 40.

Further rightward movement of the blade 16 now serves to tension the spring 20. When, however, the spring is sufficiently tensioned the left hand nib 47 now engages the end 42 to lift the latter out of engagement with the shoulder 40. As the shutter is now free and fully tensioned, it will quickly move to the right to make the exposure. During this movement of the shutter the end 42 of spring 43 rises along the periphery 48 of the shutter, as shown in Fig. 2. At the completion of exposure, the end 42 then drops behind the shoulder 41 to hold the shutter against rebound, the advantages of which are apparent to those in the art. When the shutter is moved from the right to the left, Fig. 3 to Fig. 1, to make an exposure, the operation is just the reverse. In this case, the right hand nib 47 serves to disengage the end 42 at the time spring 20 is tensioned; and, after the exposure is made, the end 42 then drops behind the shoulder 40, as shown in Fig. 1, to prevent shutter rebound. Thus when the shutter is operated in either direction, the holding spring 43 not only serves to maintain the shutter stationary until the shutter spring is tensioned, but also prevents shutter rebound after the exposure has been made. In addition, the moving of the blade 16 to tension the shutter spring also serves to release the shutter in timed relation to the movement of the blade and the tensioning of the spring.

With the above described shutter mechanism, successive exposures may be made by alternately moving the shutter 11 in opposite directions, as is apparent. During such movement the slot or exposure opening 14 quickly passes over the lens opening 15 to make an instantaneous exposure. It is often desirable, however, to also make time exposures. The latter are secured, as is well known, by arresting the movement of the shutter 11 so that the latter comes to rest with the slot 14 thereof in registry with the lens opening 15, as shown in Fig. 4. After the time exposure is complete, the shutter is then released and the shutter returned to its original position as shown in Figs. 1 and 3.

To secure these time exposures, the present invention provides a time stop lever 51 which is loosely mounted on the shutter stud 13. This lever is preferably in the form of a bellcrank and is provided with a pair of angularly arranged arms 52 and 53, the inner edges 54 and 55 of which lie in the path of the shutter lug 21 to which the end of the shutter spring 20 is anchored. Thus actuation of the shutter 11 brings the lug 21 into engagement with one of the edges 54 or 55 to rock the lever 51 with the shutter 11 about the common pivot 13. The longer arm 52 engages a pair of spaced lugs 56 on the plate 11 to limit the movement of the lever 51. These lugs cooperate with a pair of shutter stops 57 and 58 to limit the movement of the shutter, as is apparent. The lugs 56 are so spaced as to permit full movement of the shutter in either direction, as shown in Figs. 1 and 3 when an instantaneous exposure is made. When, however, a time exposure is made, a time stop button 59 is rotated in a hole in the plate 11 from the position shown in Fig. 1 to the position shown in Fig. 4.

Now when the button 59 is thus positioned and the shutter parts are in the position shown in Fig. 1, the shutter trigger 26 is actuated to move the shutter 11 to the right to bring the lug 21 thereof into engagement with the edge 55 of the arm 53 to rock the lever 51 in clockwise direction about the pivot 13. This movement of the lever will bring the end 60 of the arm 52 into contact with the curved surface 61 of the button 59, as shown in Fig. 4. Upon said contact, the lever 51 obviously is held against further movement. As the lug 21 is now in engagement with the arm 53, the shutter movement is arrested so that the aperture 14 thereof is maintained in registry with the aperture 15 of the plate 11 to permit the taking of a time exposure as clearly shown in Fig. 4. When the desired time exposure has been completed, the trigger 26 is again actuated to return the shutter to the position shown in Fig. 1 to complete the time exposure.

Obviously time exposures can also be made when the shutter 11 is moved to the left from the position shown in Fig. 3 to the position shown in Fig. 1. In this case, the button 59 is again turned to the position shown in Fig. 4. Now when the trigger 26 is actuated, the shutter is moved to the left so that the lug 21 engages the edge 54 of the arm 52 to rock the lever 51 in a counter-clockwise about the pivot 13 to bring the end 60 of the arm 52 into engagement with the surface 61 of the button 59. Upon such engagement, the shutter movement is arrested to held the aperture 14 in registry with the lens aperture 15. At the completion of the time exposure, the shutter 26 is again actuated to return the shutter parts to the position shown in Fig. 3. When, however, instantaneous exposures are to be made, the button 59 is turned to the position shown in Figs. 1 to 3, to bring a cut away or slotted portion 62 thereof into the path of the movement of the end 60 of the arm 52. When the button 59 is thus positioned, the arm 52 of the lever 51 may travel the full distance between the lugs 56 so as to enable the shutter to move to its extreme positions as shown in Figs. 1 and 3.

Thus each time the trigger 26 is operated, the blade 16 and the shutter 11 alternately move to the right or left to make successive exposures. In order to limit the movement of the blade 16, the member 17 thereof is provided with a pair of inclined surfaces 63 and 64 which are arranged to engage a fixed stop 65 on the plate 11 to limit movement of the blade 16, in either direction as is apparent from inspection of Figs. 1 to 4.

Figs. 5 and 6 show a modified form of shutter holding spring, and Fig. 5 shows a novel arrangement by which the spring is anchored to the shutter plate 11. This spring 70 is of the shape best shown in Fig. 6 and has the free end thereof bent at 72 so as to engage the shoulders 40 and 41 of the shutter 12, in the same manner as the spring 43, above described. The other end of the spring 70 is formed to provide a hollow rectangular shaped portion, generally indicated by the numeral 73 and of the shape best shown in Fig. 6. This portion 73 is adapted to be positioned in a square hole 74 formed in a boss or lug 75 on the plate 11. The hole 74 is angularly arranged so that the portion 73 engages the opposite corners of the hole, as shown in Fig. 5.

The spring is positioned by inserting the portion 73 in the hole 74 so that it extends diagonally across the latter so as to engage the opposite corners, as illustrated in Fig. 5. In order to securely retain the portion 73 in position, the latter is formed to provide a flexible end 76 which is normally arranged as shown in full lines, Fig. 6. When, however, the portion 73 is positioned in the hole 74, the end 76 flexes as shown in dotted lines on Fig. 6. In the latter relation, the end 76 tends to spread to increase the size of the portion 73, and thus securely clamp the portion in the opposite corners of the hole 74 to resiliently, yet securely, hold the portion 73 in position therein. By means of this arrangement, the spring 70 may be easily and quickly secured to the plate 11, and when so secured is automatically positioned and aligned relative to the shutter 12, as illustrated in Fig. 5.

It will be appreciated from the above description that when the shutter spring 20 is tensioned and the holding spring 43 or 70 is released, as shown in Fig. 2, the shutter 12 will quickly move across or be brought into registry with the aperture 15 to make an exposure. However, in order to insure positively such movement, the present invention also provides an arrangement for initiating movement of the shutter in case the latter should tend to slightly bind or stick. To secure this result, an edge 75 of the shutter operating blade or member 16 is adapted to contact the lug 21 of the shutter substantially simultaneously with the release of the holding spring 43 or 70, as clearly illustrated in Fig. 2. This engagement serves to initiate movement of the shutter which is then actuated by the tensioned spring 20. Obviously, when the shutter moves from the position shown in Fig. 3 to that shown in Fig. 1, a similar edge 76 on the blade 16 similarly engages the lug 21 to initiate shutter movement. By means of this arrangement, movement of the shutter is positively insured upon release of the holding spring 43 or 70.

It is thus apparent from the above description that the present invention provides a single member which not only holds the shutter until the latter has been fully tensioned, and, after the exposure is made, again positively holds the shutter against rebound. It is also apparent that the shutter operating blade is provided with an arrangement for releasing the shutter holding member after the shutter spring has been fully tensioned. A time stop lever is also loosely mounted on the shutter pivot and may be held in a position to maintain the shutter aperture in registry with the lens aperture to permit the taking of a time exposure. The two arms of the time stop lever constitute, in effect, a bellcrank lever which is loosely mounted on the shutter stud 13 as it freely moves there-about when the shutter is actuated.

While one embodiment of the invention has been disclosed, it is to be understood that the inventive idea may be carried out in a number of ways. The present invention is therefore not to be limited to the precise details described but is intended to cover all variations and modifications thereof falling within the spirit of the invention and the scope of the appended claims.

I claim:

1. In a photographic shutter, the combination with an apertured plate, a shutter pivotally mounted on said plate and adapted to be moved in opposite directions to uncover said aperture to make exposures, of an operating blade pivotally mounted on said plate independently of said shutter, a shutter tension spring connecting said blade and said shutter, means for moving said blade in either of said directions to tension said spring, a leaf spring mounted on said plate and arranged to engage a peripheral shoulder on said shutter to hold the latter against movement until said spring is tensioned, means on said blade arranged to engage said leaf spring to move the latter out of engagement with shoulder to permit the shutter to move under the action of said tensioned spring to make an exposure, and a second shoulder on said shutter engageable by said leaf spring to prevent shutter rebound after an exposure has been made.

2. In a photographic shutter, the combination with an apertured plate, a shutter pivotally mounted on said plate and adapted to be moved in opposite directions to uncover said aperture to make exposures, of an operating blade pivotally mounted on said plate independently of said shutter, a shutter tension spring connecting said blade and said shutter, means including an axially movable shutter trigger for moving said blade in either of said directions to tension said spring, a shoulder formed on the periphery of said shutter, a leaf spring mounted on said plate and having an end thereof arranged to engage said shoulder to hold the shutter against movement until the blade has been moved sufficiently to tension said spring, a cam on the periphery of said blade adapted to engage said end to momentarily move the latter out of engagement with said shutter to release the shutter so that it may move under the action of the tensioned spring to make an exposure, and means on said blade adapted to engage a portion of said shutter after said spring has been tensioned for initiating the movement of said shutter.

3. In a photographic shutter, the combination with an apertured plate, a shutter pivotally mounted on said plate and adapted to be moved in opposite directions to uncover said aperture to make exposures, of an operating blade pivotally mounted on said plate independently of said shutter, a shutter tension spring connecting said blade and said shutter, means for moving said blades in either of said directions to tension said spring, a pair of spaced shoulders formed on the periphery of said shutter, a leaf spring mounted on said plate and having an end thereof arranged to engage one of said shoulders to hold the shutter against movement until said shutter spring has been tensioned, a cam on the periphery of said plate arranged to engage and momentarily lift said end out of engagement with said shutter to release the latter so that it may move under the action of the tensioned shutter spring to uncover said aperture to make an exposure, a lug on said shutter, and an edge on said blade arranged to engage said lug when said end is disengaged to initiate the movement of said shutter, said end engaging the other shoulder after the exposure has been made to prevent rebound of the shutter.

4. In a photographic shutter, the combination with an apertured shutter plate, an apertured shutter pivotally mounted on said plate and adapted to be moved in opposite directions to uncover said plate aperture to make exposures, of shutter tensioning means operatively connected to said shutter to tension the latter, a shutter holding member mounted on said plate and arranged to engage said shutter to hold the latter against movement until said means has been sufficiently tensioned to operate said shutter, means for moving said member out of engagement with said shutter to permit operation thereof to make an exposure, means for operating said tensioning means, a time stop lever loosely mounted on the shutter pivot, means on said shutter adapted to engage and move said lever when said shutter is moved in either direction, and means on said plate movable into the path of said lever for arresting the movement of said lever to limit the movement of said shutter to bring and hold the aperture of said shutter in registry with the aperture of said plate to make a time exposure.

5. In a photographic shutter, the combination with an apertured shutter plate, an apertured shutter pivotally mounted on said plate and adapted to be moved in opposite directions to uncover said plate aperture to make exposures, of shutter tensioning means operatively connected to said shutter to tension the latter, a shutter holding member mounted on said plate and arranged to engage said shutter to hold the latter against movement until said means has been sufficiently tensioned to operate said shutter means for moving said member out of engagement with said shutter to permit operation thereof to make an exposure, means for operating said tensioning means, a time stop lever loosely mounted on the shutter pivot, means on said shutter adapted to engage a portion of said lever to move the latter as a unit with said shutter when the latter is moved in either direction, stops on said plate arranged to be engaged by said lever to limit the movement thereof in said opposite directions, and a member movable into the path of said lever to limit the movement of said lever and said shutter to position the aperture of said shutter in registry with the aperture of said plate to make a time exposure.

6. In a photographic shutter, the combination with an apertured shutter plate, an apertured shutter pivotally mounted on said plate and adapted to be moved in opposite directions to uncover said plate aperture to make exposures, of shutter tensioning means operatively connected to said shutter to tension the latter, a shutter holding member mounted on said plate and arranged to engage said shutter to hold the latter against movement until said means has been sufficiently tensioned to operate said shutter, means for moving said member out of engagement with said tensioned shutter to permit operation thereof to make an exposure, means for operating said tensioning means, a time stop lever loosely mounted on the shutter pivot and movable by said shutter, said stop lever being formed with a pair of spaced arms, stops on said plate arranged to engage one of said arms to limit the movement of said lever, a lug on said shutter arranged to engage said arms to limit movement of said shutter in said opposite directions, and a button movably mounted on said plate and arranged to be moved into the path of said one arm to limit the movement of said lever to position the aperture of said shutter in registry with the aperture of said plate to make a time exposure.

7. In a photographic shutter, the combination with an apertured plate, a shutter pivotally mounted on said plate and adapted to be moved in opposite directions to uncover said aperture to make exposures, of an operating blade pivotally mounted on said plate independently of said shutter, a shutter tension spring connecting said blade and said shutter, means for moving said blade in either of said directions to tension said spring, a leaf spring mounted on said plate and arranged to engage a peripheral shoulder on said shutter to hold the latter against movement until said spring is tensioned, means on said blade arranged to engage said leaf spring to move the latter out of engagement with said shoulder to permit the shutter to move under the action of said tensioned spring to make an exposure, a second shoulder on said shutter engageable by said leaf spring to prevent shutter rebound after an exposure has been made, a time stop lever loosely mounted on said plate, means on said shutter for moving said lever as a unit therewith, means on said plate for limiting the movement of said lever, and means for positioning said lever on said plate to retain the aperture of said shutter in registry with the aperture of said plate to make a time exposure.

8. In a photographic shutter, the combination with an apertured plate, a shutter pivotally mounted on said plate and adapted to be moved in opposite directions to uncover said aperture to make exposures, of an operating blade pivotally mounted on said plate independently of said shutter, a shutter tension spring connecting said blade and said shutter, means for moving said blade in either of said directions to tension said spring, a pair of spaced shoulders formed on the periphery of said shutter, a leaf spring mounted on said plate and having an end thereof arranged to engage one of said shoulders to hold the shutter against movement until said shutter spring has been tensioned, a cam on the periphery of said blade arranged to engage and momentarily lift said end out of engagement with said shutter to release the latter so that it may move under the action of the tensioned shutter spring to uncover said aperture to make an exposure, a lug on said shutter, an edge on said blade arranged to engage said lug when said end is disengaged to initiate the movement of said shutter, said end engaging the other shoulder after the exposure has been made to prevent rebound of the shutter, a time stop lever in the form of a bell crank loosely mounted on the pivot of said shutter, the lug on said shutter being arranged to engage the arms of said bell crank to move the latter with said shutter, spaced stops on said plate arranged in the path of one of said arms to limit the movement of said bell crank in either of said directions, and a movable stop button on said plate adapted to be moved into the path of said one arm to position said shutter so that the aperture thereof is maintained in registry with the aperture of said plate to permit the taking of a time exposure.

9. In a photographic shutter, the combination with an apertured plate, a shutter pivotally mounted on said plate and adapted to uncover said aperture to make an exposure, of shutter tensioning means operatively connected to said shutter to tension the latter, a shutter holding member mounted on said plate and having a free end arranged to engage a shoulder formed on said shutter to hold said shutter against movement until the latter has been properly tensioned and being also movable into engagement with a second shoulder on said shutter to hold the latter against rebound after an exposure has been made, means for moving said member out of holding engagement with said shutter after the latter has been tensioned, and means on said plate for accurately positioning and resiliently retaining said member in position to engage and hold said shutter.

10. In a photographic shutter, the combination with an apertured plate, a shutter pivotally mounted on said plate and adapted to uncover said aperture to make an exposure, of shutter tensioning means operatively connected to said shutter to tension the latter, a shutter holding member in the form of a strip of resilient material mounted on said plate and having a free end arranged to engage and hold said shutter against movement until the latter has been properly tensioned and being also movable into engagement with said shutter to hold the latter against rebound after an exposure has been made, means for moving said member out of holding engagement with said shutter after the latter has been tensioned, said plate being formed with an apertured lug, and a portion of said member arranged to be positioned in and to resiliently engage edges of the aperture of said lug to secure said member in position on said plate.

11. In a photographic shutter, the combination with an apertured plate, a shutter pivotally mounted on said plate and adapted to uncover said aperture to make an exposure, of shutter tensioning means operatively connected to said shutter to tension the latter, a shutter holding member mounted on said plate and having a free end arranged to engage a shoulder formed on said shutter to hold said shutter against movement until the latter has been properly tensioned and being also movable into engagement with a second shoulder on said shutter to hold the latter against rebound after an exposure has been made, means for moving said member out of holding engagement with said shutter after the latter has been tensioned, said plate being formed with an apertured lug, a rectangularly arranged portion formed on the other end of said member and arranged to be positioned in the aperture of said lug so as to engage opposite corners thereof, and means on said portion for yieldably retaining said portion in engagement with said corners.

12. In a photographic shutter, the combination with an apertured plate, a shutter pivotally mounted on said plate and adapted to be moved to uncover said aperture to make exposures, of an operating blade pivotally mounted on said plate independently of said shutter, a shutter tension spring connecting said blade and said shutter, means for moving said blade to tension said spring, a leaf spring mounted on said plate and arranged to engage a peripheral shoulder on said shutter to hold the latter against movement until said spring is tensioned, means on said blade arranged to engage said leaf spring to move the latter out of engagement with shoulder to permit the shutter to move under the action of said tensioned spring to make an exposure, and a second shoulder on said shutter engageable by said leaf spring to prevent shutter rebound after an exposure has been made.

CHESTER W. CRUMRINE.